United States Patent
Lundgren

(10) Patent No.: US 11,702,294 B2
(45) Date of Patent: Jul. 18, 2023

(54) CONVEYOR GUIDE RAIL ATTACHMENT

(71) Applicant: FLEXLINK AB, Gothenburg (SE)

(72) Inventor: Tomas Lundgren, Gothenburg (SE)

(73) Assignee: FLEXLINK AB, Gothenburg (SE)

( * ) Notice: Subject to any disclaimer, the term of this patent is extended or adjusted under 35 U.S.C. 154(b) by 0 days.

(21) Appl. No.: 17/914,452

(22) PCT Filed: Mar. 26, 2021

(86) PCT No.: PCT/SE2021/050269
§ 371 (c)(1),
(2) Date: Sep. 26, 2022

(87) PCT Pub. No.: WO2021/201751
PCT Pub. Date: Oct. 7, 2021

(65) Prior Publication Data
US 2023/0118516 A1    Apr. 20, 2023

(30) Foreign Application Priority Data

Mar. 30, 2020 (SE) ................... 2050352-0

(51) Int. Cl.
*B65G 21/20* (2006.01)
*B65G 21/06* (2006.01)
(52) U.S. Cl.
CPC ......... *B65G 21/2072* (2013.01); *B65G 21/06* (2013.01)
(58) Field of Classification Search
CPC ........................... B65G 21/2072; B65G 21/06
USPC ........................................... 198/836.1–836.4
See application file for complete search history.

(56) References Cited

U.S. PATENT DOCUMENTS

| | | | | |
|---|---|---|---|---|
| 3,800,938 A * | 4/1974 | Stone | ...... | B65G 21/02 198/836.3 |
| 3,825,108 A * | 7/1974 | Stone | ...... | B65G 21/06 198/570 |
| 4,225,035 A * | 9/1980 | Mohney | ...... | B65G 21/2072 198/836.3 |
| 4,470,499 A * | 9/1984 | Sijbrandij | ...... | B65G 21/06 403/312 |
| 4,502,594 A * | 3/1985 | Sijbrandij | ...... | B65G 21/2072 198/836.3 |

(Continued)

FOREIGN PATENT DOCUMENTS

| | | |
|---|---|---|
| CN | 109775245 A | 5/2019 |
| DE | 2623814 A1 | 12/1977 |

(Continued)

OTHER PUBLICATIONS

International Searching Authority, International Search Report and Written Opinion received for International Application No. PCT/SE2021/050269, dated Apr. 27, 2021, 12 pages, Swedish Patent and Registration Office, Sweden.

*Primary Examiner* — Mark A Deuble
(74) *Attorney, Agent, or Firm* — Alston & Bird LLP

(57) ABSTRACT

Conveyor beam attachment (2) adapted to be attached to a conveyor beam (41), comprising a first catch (5) adapted to engage one flange (43) of a T-slot (42) in the conveyor beam (41), and comprising a second and third catch (6, 7) adapted to engage the other flange (44) of the T-slot in conveyor beam (41), and where the first catch (5) or the second and third catches (6, 7) are spring-loaded. The advantage of the invention is that a guide rail can easily be mounted to and removed from a conveyor beam (41).

15 Claims, 4 Drawing Sheets

(56) References Cited

U.S. PATENT DOCUMENTS

| | | | |
|---|---|---|---|
| 5,322,160 A * | 6/1994 | Markiewicz | B65G 21/2072 198/836.3 |
| 5,335,782 A * | 8/1994 | Herzog | B65G 21/2072 198/836.3 |
| 5,498,098 A | 3/1996 | Cairns | |
| 5,501,544 A | 3/1996 | Cairns | |
| 5,626,221 A | 5/1997 | Ledingham | |
| 5,782,339 A | 7/1998 | Drewitz | |
| 5,819,911 A | 10/1998 | Ledingham | |
| 5,860,511 A | 1/1999 | Ensch et al. | |
| 5,927,480 A | 7/1999 | Mccaffrey et al. | |
| 7,548,839 B2 * | 6/2009 | Dodds | A61B 5/0002 703/3 |
| 7,798,315 B2 * | 9/2010 | Shun | B65G 21/06 198/836.3 |
| 2002/0148709 A1 * | 10/2002 | Claig | B65G 21/2072 198/860.1 |
| 2003/0116410 A1 | 6/2003 | Ledingham | |
| 2003/0205447 A1 | 11/2003 | Ledingham | |
| 2013/0313383 A1 | 11/2013 | Herzog | |
| 2022/0212876 A1 * | 7/2022 | Kokx | B65G 21/06 |

FOREIGN PATENT DOCUMENTS

| | | |
|---|---|---|
| DE | 10118566 A1 | 10/2002 |
| DE | 202016102181 U1 | 7/2016 |
| EP | 1840050 A1 | 10/2007 |
| EP | 2103555 A1 | 9/2009 |
| FR | 2500088 A1 | 8/1982 |
| FR | 2520817 A1 | 8/1983 |
| FR | 2544292 A1 | 10/1984 |
| FR | 2859655 B1 | 12/2005 |
| GB | 1510232 A | 5/1978 |
| GB | 2119054 A | 11/1983 |

* cited by examiner

CONVEYOR GUIDE RAIL ATTACHMENT

CROSS REFERENCE TO RELATED APPLICATIONS

This application is a National Stage Application, filed under 35 U.S.C. § 371, of International Application No. PCT/SE2021/050269, filed Mar. 26, 2021, which claims priority to Swedish Application No. 2050352-0, filed Mar. 30, 2020; the contents of both of which as are hereby incorporated by reference in their entireties.

BACKGROUND

Related Field

The present invention relates to a conveyor beam attachment adapted to be used in conveyor systems. The conveyor beam attachment is adapted to be attached to a conveyor beam and will simplify the installation and rearrangement of components such as guide rails or sensors at a conveyor system.

Description of Related Art

Conveying devices, such as those that are used for moving objects between different stations in a factory, usually comprise a conveying track comprising a belt or a chain. A conveyor track consists of an endless conveyor chain or belt that is supported by conveyor beams. The conveyor chain or belt glides on sliding surfaces on the conveyor beams in order to reduce the friction and the wear. This surface may be the conveyor beam itself or may be an additional component, such as a slide rail. The conveyor track may comprise curves and bends and at the end regions of a conveyor track, there is either a drive unit that drives the chain or an idler end unit that supports the chain for the return path.

There are a number of different designs for such conveyors available. Products may either be conveyed directly on the conveyor belt or chain, or may be conveyed on product carriers. A conveyor chain is made up of a large number of individual chain parts, designed to be able to support the conveyed products. A conveyor system is adapted to different types of products. For some products, such as medical equipment or in lab automation, the system will comprise a specific product carrier adapted to hold that product, e.g. a test tube. Other products will be supported directly by the conveyor chain, and will be guided in the sideway directions by a guide rail attached to the longitudinal beams of the conveyor.

A complete guide rail will comprise a guide rail holder fixedly attached to the conveyor beam by a screw, using a T-nut attached to a groove in the conveyor beam. A guide rail is attached to the guide rail holder, where the guide rail often comprises a vertical rod attached to the guide rail holder in an adjustable manner, and a horizontal rod attached to the vertical rod in an adjustable manner. The horizontal rod holds the actual guide rail. The rods may be adjusted e.g. by screws or levers. In this way, it is possible to adapt the conveyor for products of different sizes.

Normally, the guide rail is adjusted for a specific product and is not changed very often. There are some examples of guide rails that can be adjusted in a sideway direction between two or more predefined positions, which will allow for a relatively easy adjustment to a few predefined positions. In some conveyors, there are also automatic guide rails controlled by motors or actuators that are automatically adjusted to predefined positions.

Often, the position of a guide rail is adjusted by a screw, sometimes provided with a knob or the like, that holds a guide rail clamp together. US5626221A, US5782339A, DE10118566A1, FR2859655B, US5860511A, EP1840050A1, US2003205447A, US5498098A, US5501544A, US2013313383A and US4470499A show different examples of adjustable guide rails, where the guide rail is adjusted by clamping one or to rods with a clamp. US 5927480 A, US5819911 A and US2003116410A show examples of guide rails that can be adjusted between at least two predefined positions.

Even if the known guide rails functions well, there is still room for an improved attachment of a guide rail assembly.

BRIEF SUMMARY

An object of the invention is therefore to provide an improved conveyor beam attachment. A further object of the invention is to provide an improved guide rail assembly. A further object of the invention is to provide a conveyor comprising such a guide rail assembly.

The solution to the problem according to the invention is described in the characterizing part of claim 1 with regard to the conveyor beam attachment, in claim 10 with regard to the guide rail assembly, and in claim 15 with regard to a conveyor. The other claims contain advantageous embodiments and further developments of the conveyor beam attachment and assembly.

In a conveyor beam attachment adapted to be attached to a conveyor beam, comprising a first catch having a first nose pointing in a first direction, where the first catch is adapted to engage one flange of a T-slot in the conveyor beam, the object of the invention is achieved in that the conveyor beam attachment comprises a second catch having a second nose and a third catch having a third nose, where the second nose and the third nose points in a second direction opposite the first direction, where the second catch and the third catch are adapted to engage the other flange of the T-slot in the conveyor beam, where the second catch and the third catch are arranged on each side of the first catch, and that the first catch is spring-loaded and can be pushed to a release position with an engagement button or that the second catch and the third catch are spring-loaded and can be pushed to a release position with an engagement button.

By this first embodiment of the conveyor beam attachment according to the invention, a conveyor beam attachment that can easily be attached to and removed from a conveyor beam is provided. By pressing an engagement button, the catches are moved closer together such that the distance between the noses of the catches is smaller than the height of a T-slot of a conveyor beam. The catches can thus be inserted into the T-slot. By releasing the engagement button, the catches spread apart and the first catch will press against one flange of the T-slot, and the second and third catches will press against the other flange of the T-slot. The engagement button, and thus the catches, are spring-loaded such that the conveyor beam attachment is securely attached to the conveyor beam. The noses of the catches are somewhat beveled and will interact with the inner edge of a flange, such that the side bearing surface of the conveyor beam attachment will be pressed against the conveyor beam.

It is also possible to lock the movable catch such that it can not move. A lock screw threaded in the conveyor beam attachment can be used to push the engagement button to its idle state, in which the catches bears against the flanges of the conveyor beam. By forcing the catches apart with a lock screw, the clamping force of the catches is increased and the stability of the conveyor beam attachment is improved. This is especially advantageous if the conveyor beam attachment is used to attach a single component, such as a stop device or a sensor that may not displace even a small amount. By blocking the engagement button, accidental displacement of the conveyor beam attachment is prohibited. The lock screw is optional, when the conveyor beam attachment is used for a guide rail, the plurality of used conveyor beam attachments for the guide rail will stabilize each other.

The conveyor beam attachment is in one example provided with a vertical opening adapted to hold a vertical rod, e.g. a vertical support rod or another device having a vertical rod attachment. Such devices may e.g. include a stop device, different sensors such as RFID-sensors, optical sensors such as retro-reflective sensors, through-beam sensors, etc. In the shown example, the vertical opening and thus the vertical rod is provided with an oval shape. This will prevent the vertical rod to rotate in the vertical opening. The vertical opening is provided with a first spring-loaded protrusion adapted to engage one of several grooves in the vertical rod. The vertical rod is provided with a set of grooves, arranged at a predefined distance from each other. In the shown example, the distance between the grooves is the same, but it would be possible to select only a few grooves at desired positions. By pressing a first adjustment button, the first protrusion is pushed to a release position, such that the height of the vertical rod can be set. By releasing the first adjustment button, the first protrusion engages with a groove and locks the vertical rod in the selected height position.

In one example, the vertical rod is a vertical support rod provided with a support opening adapted to hold a horizontal rod, e.g. a horizontal support rod or another device having a horizontal rod attachment. Such devices may e.g. include a stop device, different sensors such as RFID-sensors, optical sensors such as retro-reflective sensors, through-beam sensors, etc. In the shown example, the support opening and thus the horizontal rod is provided with an oval shape. This will prevent the horizontal rod to rotate in the support opening. For a horizontal support rod, this will also help to stabilize a guide rail attached to the horizontal support rod. The support opening is provided with a second spring-loaded protrusion adapted to engage one of several grooves in the horizontal rod. The horizontal rod is provided with a set of grooves, arranged at a predefined distance from each other. In the shown example, the distance between the grooves is the same, but it would be possible to select only a few grooves at desired positions, such that predefined widths of the conveyor track can easily be set by a horizontal support rod. By pressing a second adjustment button, the second protrusion is pushed to a release position, such that the width position of the horizontal support rod can be adjusted. By releasing the second adjustment button, the second protrusion engages with a groove and locks the horizontal support rod in that position.

The conveyor beam attachment is in another example provided with a horizontal opening adapted to receive another conveyor beam attachment. In this example, the conveyor beam attachment may be somewhat quadratic or rectangular, having a front bearing surface arranged at the catches, and a rear side being parallel to the front bearing surface. The rear side is provided with a horizontal opening adapted to receive a conveyor beam attachment. The horizontal opening is rectangular, resembling a T-slot, and is provided with an upper flange and a lower flange, where the distance between the upper flange and the lower flange will correspond to the vertical distance between the first catch and the second and third catches in a released state, and thus to the height of a T-slot in a conveyor beam. In this example, the conveyor beam attachment may e.g. be used as a distance piece to which a guide rail assembly can be attached, e.g. when the width of the conveyor track needs to be widened. The conveyor beam attachment can also be used when a sensor or the like needs to be positioned further away from a conveyor beam.

BRIEF DESCRIPTION OF THE FIGURES

The invention will be described in greater detail in the following, with reference to the embodiments that are shown in the attached drawings, in which.

DETAILED DESCRIPTION OF VARIOUS EMBODIMENTS

The embodiments of the invention with further developments described in the following are to be regarded only as examples and are in no way to limit the scope of the protection provided by the patent claims. References such as longitudinal, horizontal, vertical, right, left etc. refer to directions of a conveyor in normal use.

Figure 1:
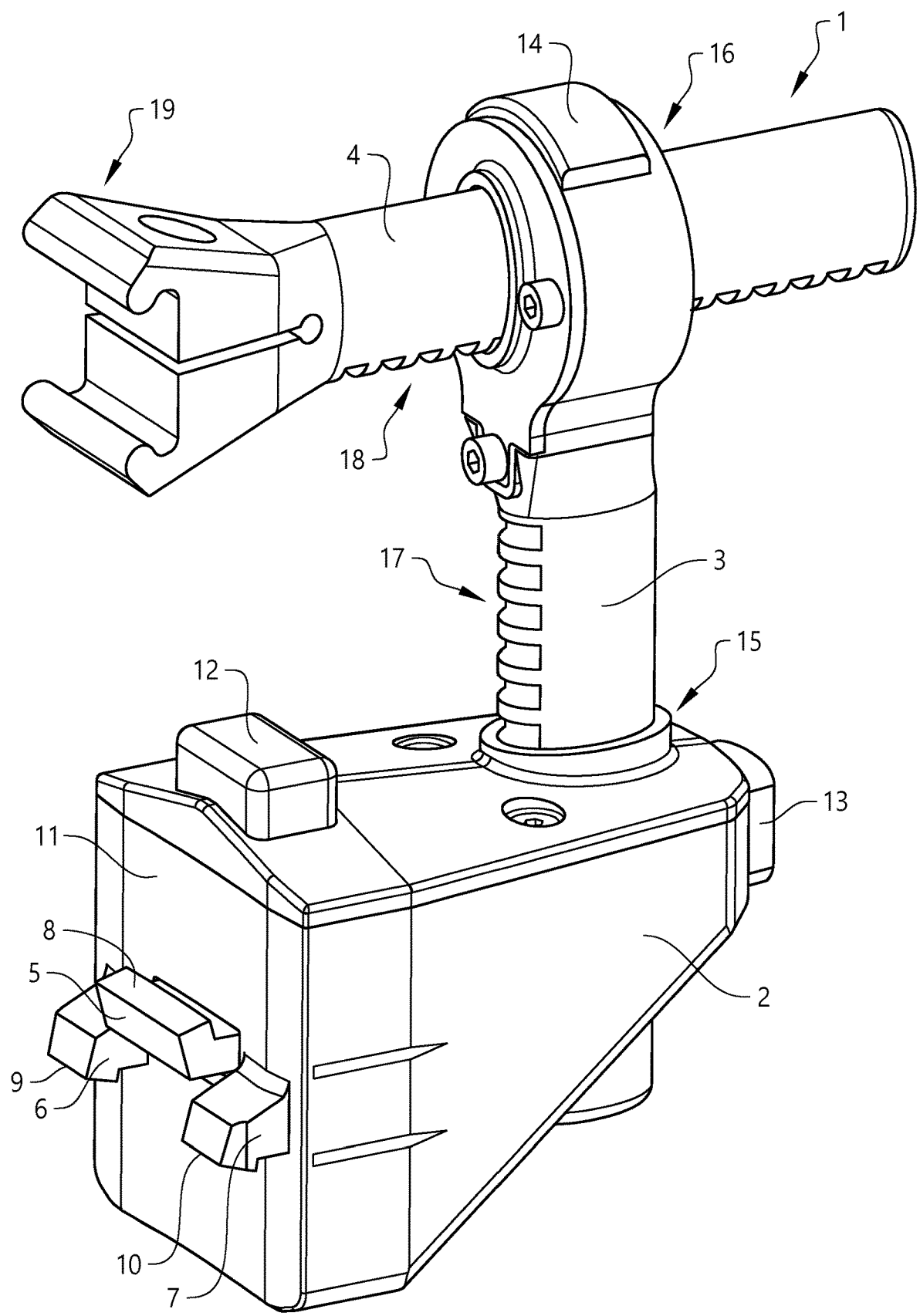
FIG. 1 shows a view of a guide rail assembly comprising a conveyor beam attachment.
Figure 2:
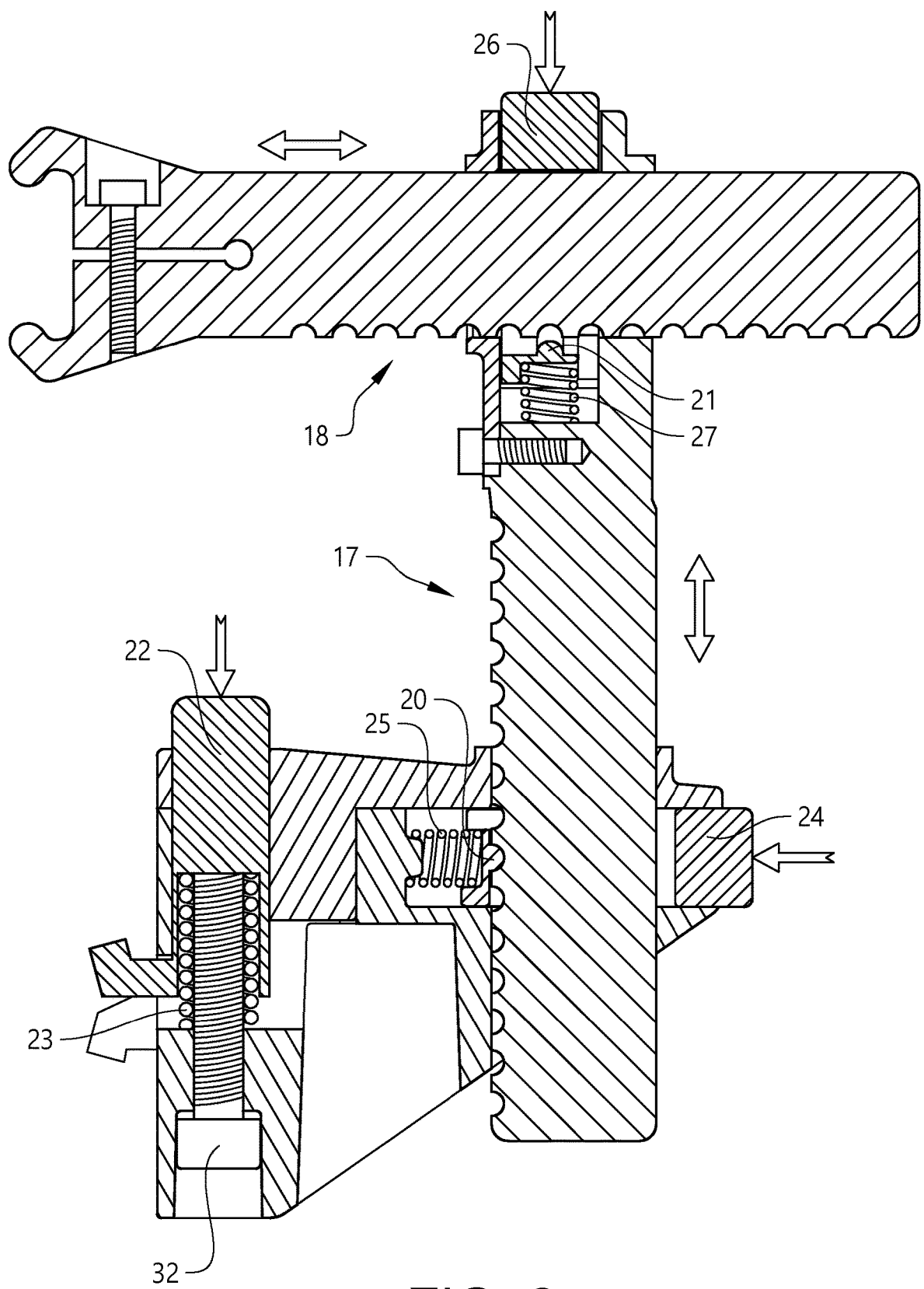
FIG. 2 shows a cut view of a guide rail assembly.
Figure 3:
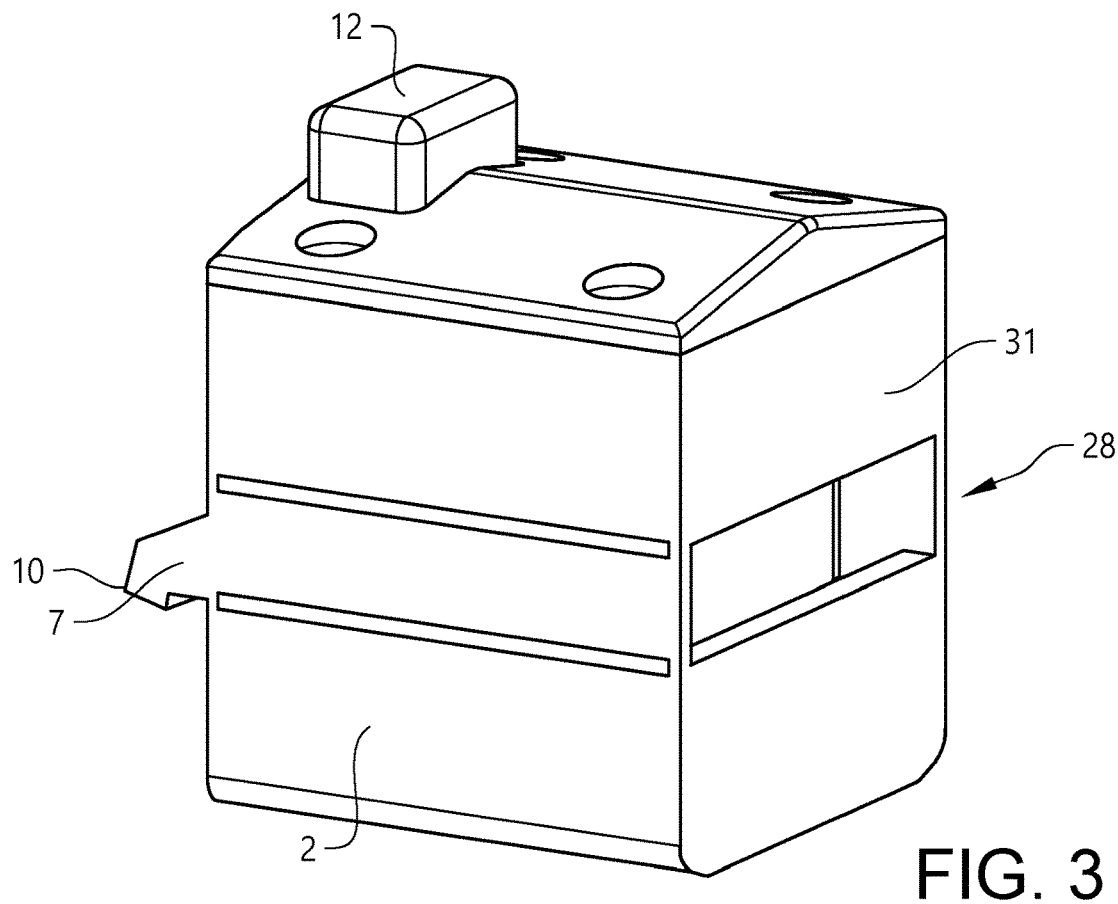
FIG. 3 shows a second example of a conveyor beam attachment.
Figure 4:
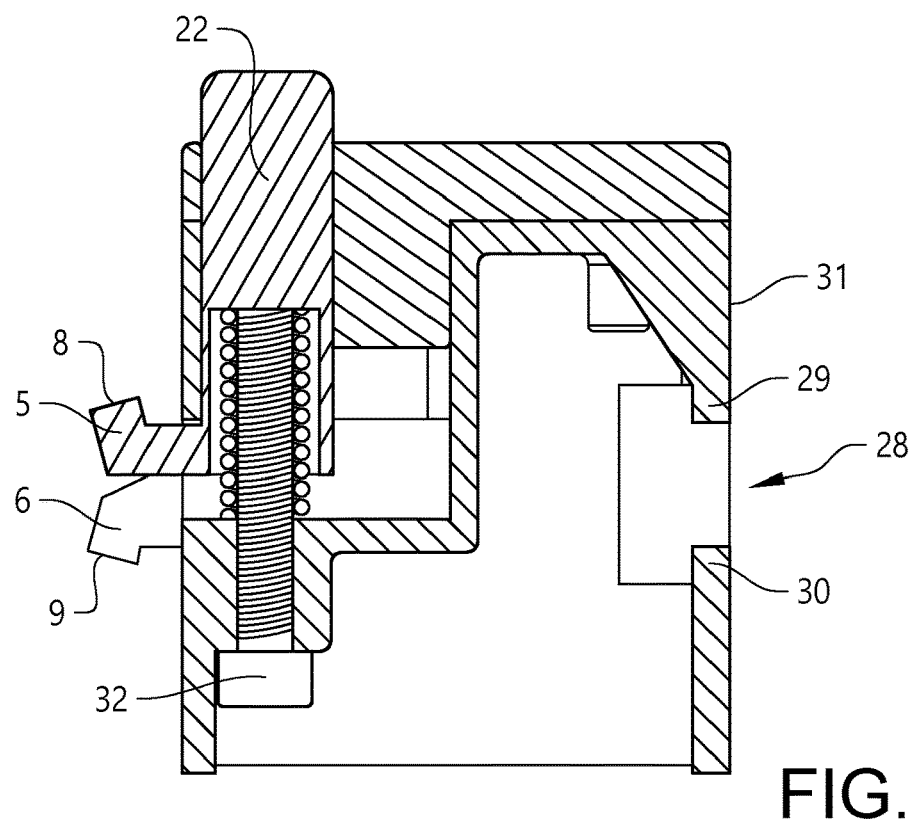
FIG. 4 shows a cut view of the conveyor beam attachment of FIG. 3.
Figure 5:
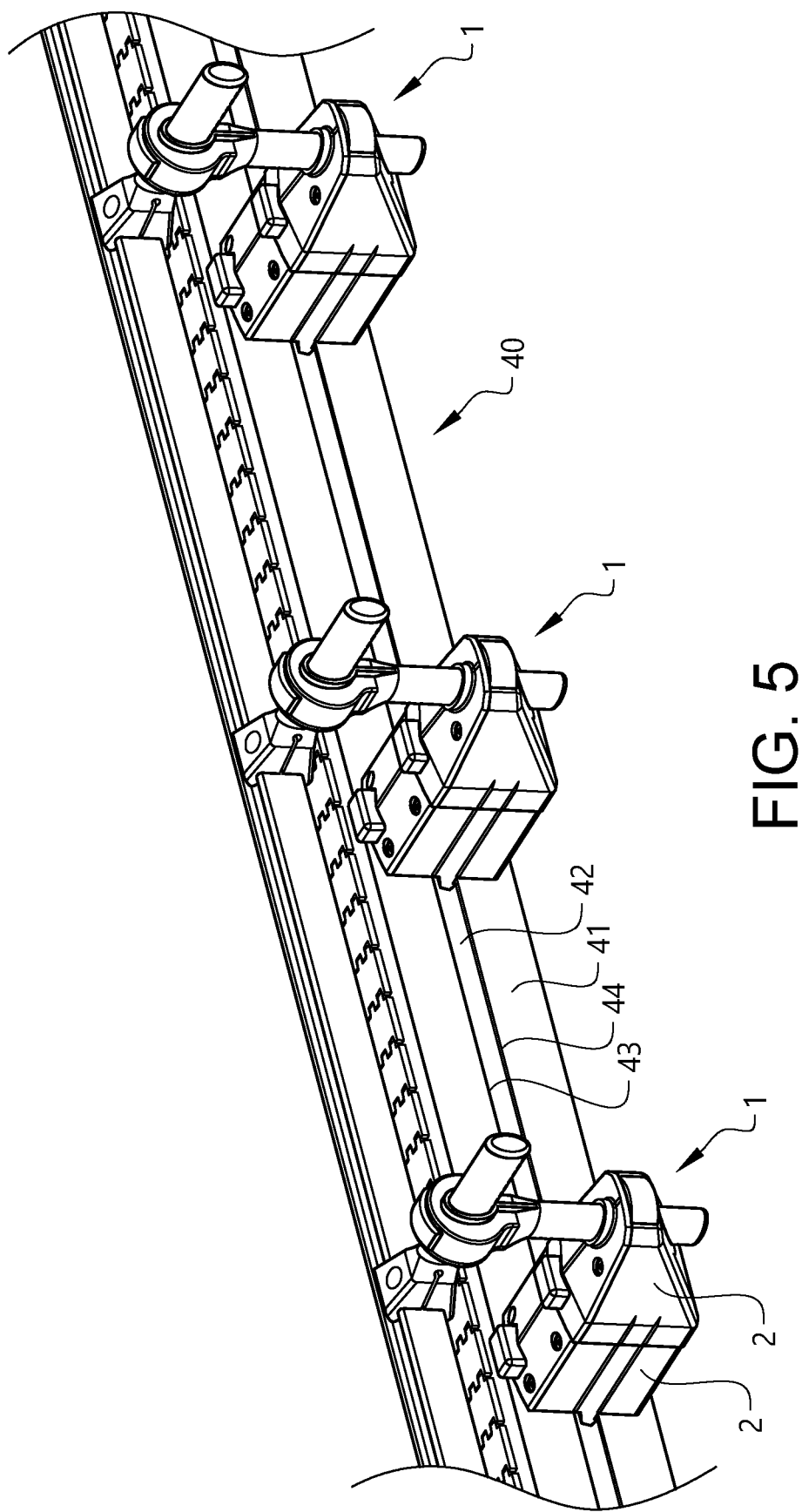
FIG. 5 shows a conveyor comprising a plurality of guide rail assemblies.

FIGS. 1 and 2 show an example of a guide rail assembly comprising a first example of a conveyor beam attachment, FIGS. 3 and 4 show a second example of a conveyor beam attachment, and FIG. 5 shows a conveyor comprising a guide rail assembly. The guide rail assembly 1 comprises a conveyor beam attachment 2, a vertical support rod 3 and a horizontal support rod 4. The conveyor beam attachment is adapted to be attached to a conveyor beam by a T-slot in the conveyor beam.

The conveyor beam attachment 2 comprises a first catch 5 provided with a first nose 8 pointing in a first direction. In the shown example, the first nose points upwards, and is arranged on a first moveable body 22 that is provided with an engagement button 12. The body and thus the first catch is spring-loaded, e.g. by a first coil spring 23. The first catch 5 with the first nose 8 is adapted to engage one flange of a T-slot in the conveyor beam, here the upper flange.

The conveyor beam attachment further comprises a second catch 6 having a second nose 9 and a third catch 7 having a third nose 10. The second nose 9 and the third nose 10 points in an opposite direction to the first catch, here they point downwards. The second catch with the second nose and the third catch with the third nose are adapted to engage the other flange of the T-slot in the conveyor beam, here the lower flange. The second catch and the third catch are arranged on each side of the first catch in a horizontal direction. In the shown example, the first catch is arranged on the first movable body and the second and third catches are fixed on the conveyor beam attachment. The first catch could also be fixed, with the second catch and the third catch arranged on the first moveable body 22.

By using a movable catch, the conveyor beam attachment can easily be attached to and removed from a conveyor beam. This will reduce the installation time of a conveyor system, and will simplify the exchange of a conveyor beam attachment. By pressing the engagement button 12 of the first moveable body 22, the first catch 5 is moved towards the second and the third catches 6, 7 such that the distance between the noses of the catches is reduced. The distance will be smaller than the height of a T-slot of a conveyor beam. The catches can thus be inserted in the T-slot, between the flanges. By releasing the engagement button 12, the catches spread apart and the first catch will press against the upper flange of the T-slot, and the second and third catches will press against the lower flange of the T-slot. The engagement button, and thus the first catch, is spring-loaded such that the conveyor beam attachment is securely attached to the conveyor beam. The noses of the catches are somewhat bevelled and will interact with the inner edge of a flange, such that the side bearing surface 11 of the conveyor beam attachment will be pressed against the conveyor beam. The vertical distance between the first catch and the second and third catches in a released state corresponds to the height of a T-slot in the conveyor beam.

The conveyor beam attachment may also comprise a lock screw 32 adapted to lock the movable catch such that it can not move. The lock screw is threaded in the conveyor beam attachment and will push on an inner side of the first moveable body 22. When the lock screw is tightened, the engagement button 22 will be pressed to its uppermost position, which at the same time presses the catches apart. By forcing the catches apart with the lock screw, the clamping force of the catches is increased and the stability of the conveyor beam attachment is improved. This is especially advantageous if the conveyor beam attachment is used to attach a single component, such as a stop device or a sensor that may not displace even a small amount. By blocking the engagement button, accidental displacement of the conveyor beam attachment is prohibited. The lock screw is optional, when the conveyor beam attachment is used for a guide rail, the plurality of used conveyor beam attachments for the guide rail will stabilize each other.

The conveyor beam attachment 2 is in one example provided with a vertical opening 15 adapted to hold a vertical rod, in one example a vertical support rod 3. In the shown example, the vertical opening and thus the vertical support rod is provided with an oval shape, e.g. an elliptic shape. This will prevent the vertical support rod to rotate in the vertical opening. The conveyor beam attachment is provided with a second spring-loaded body 24 arranged in the vertical opening, where the second body is provided with a first protrusion 20 adapted to engage one of several grooves 17 of the vertical support rod 3. The vertical support rod is provided with a first set of grooves 17, arranged at a predefined distance from each other. In the shown example, the distance between the grooves is equal, but it would be possible to select only a few grooves at desired positions. In one example, the distance between each groove is one centimetre, which makes it easy to adjust the vertical support rod to a desired height.

By pressing a first adjustment button 13 of the second spring-loaded body 24, the first protrusion is pushed to a release position, such that the height of the vertical support rod can be set. By releasing the first adjustment button, a second coil spring 25 pushes the first protrusion to engage with a groove and locks the vertical support rod in the selected height position.

The vertical opening 15 may also hold other devices having a vertical rod attachment. Such devices may e.g. include a stop device, different sensors such as RFID-sensors, optical sensors such as retro-reflective sensors, through-beam sensors, etc. These devices can be mounted on the side of a conveyor beam in an easy way with the conveyor beam attachment, and can easily be repositioned if necessary.

The vertical support rod 3 shown in the described example comprises a support opening 16 that is adapted to hold e.g. a horizontal support rod 4. In the shown example, the support opening 16 and thus the horizontal support rod 4 is provided with an oval shape, e.g. an elliptic shape. This will prevent the horizontal support rod to rotate in the support opening. This will also help to stabilize a guide rail attached to the horizontal support rod by a guide rail clamp 19. A third spring-loaded body 26 is arranged in the support opening 16. The third body is provided with a second protrusion 21 adapted to engage one of several grooves 18 in the horizontal support rod 4. The horizontal support rod is provided with a second set of grooves 18, arranged at a predefined distance from each other. In the shown example, the distance between the grooves is equal, but it would be possible to select only a few grooves at desired positions, such that predefined widths of the conveyor track can easily be adapted to. In one example, the distance between each groove is one centimetre, which makes it easy to adjust the horizontal support rod to a desired position. With a horizontal support rod at each side of a conveyor holding a support rail, this makes it easy to adjust the width of the support rails of the conveyor track.

By pressing a second adjustment button 14 of the third body 26, the second protrusion 21 is pushed to a release position, such that the width position of the horizontal support rod can be adjusted. By releasing the second adjustment button 14, the third coil spring 27 pushes the third body with the second protrusion 21 to engage with a groove 18 and will lock the horizontal support rod in that position.

The conveyor beam attachment 2 may also hold other devices having an attachment rod. The attachment rod may be mounted either in the vertical opening 15 or in the support opening 16, depending on the intended use of the device.

The conveyor beam attachment 2 is in one example, shown in FIGS. 3 and 4, provided with a horizontal opening 28 adapted to receive another conveyor beam attachment. In this example, the conveyor beam attachment 2 may be somewhat quadratic or rectangular, having a front bearing surface 11 arranged at the catches, and a rear side 31 being parallel with the front bearing surface 11. The distance between the front bearing surface 11 and the rear side 31 corresponds to the thickness of the conveyor beam attachment. The rear side 31 is provided with a horizontal opening 28 adapted to receive another conveyor beam attachment. The horizontal opening is rectangular and resembles a T-slot, and is provided with an upper flange 29 and a lower flange 30, where the distance between the upper flange and the lower flange will correspond to the vertical distance between the first catch and the second and third catches in a released state, and thus to the height of a T-slot in a conveyor beam. In this example, the conveyor beam attachment may e.g. be used as a distance piece to which a guide rail assembly can be attached, e.g. when the width of the conveyor track needs to be widened. The conveyor beam attachment can also be used when a sensor or the like needs to be positioned further away from a conveyor beam. Several conveyor beam attachments may be mounted to each other to provide a longer distance piece.

FIG. 5 shows a conveyor 40 provided with a plurality of guide rail assemblies 1. In the shown example, each guide rail assembly 1 is mounted to a conveyor beam attachment 2 acting as a distance piece, which is attached to a conveyor beam 41. The horizontal support rods are holding a guide rail. The conveyor beam is a conventional conveyor beam comprising a T-slot 42 on each side, and which is extruded in aluminium. The T-slot is provided with an upper flange 43 and a lower flange 44. The T-slot is a conventional T-slot used e.g. in conveyor beams, and the height of the T-slot may e.g. be 8 mm or 11 mm, which are commonly used groove sizes in conveyor beams, but other sizes are of course also possible. The conveyor beam attachment is adapted to the size of the T-slot to which it is to be attached.

By using the inventive conveyor beam attachment to attach a guide rail to a conveyor beam, either alone or with a distance piece, the installation is simplified and there is no need to use T-slot nuts. Depending on the use of the conveyor, it is possible to adapt the horizontal support rod to the intended use. If only a few different widths are to be used, the horizontal support rod may only have grooves corresponding to the required widths. It is also possible to mark the predefined positions with e.g. different colour or other markings. The same applies to the vertical support rod, should only a few vertical positions be desired. The distance piece may also have different thicknesses depending on the requirements.

The invention is not to be regarded as being limited to the embodiments described above, a number of additional variants and modifications being possible within the scope of the subsequent patent claims. The conveyor beam attachment may have any size and may be made from any suitable material.

REFERENCE SIGNS

1: Guide rail assembly
2: Conveyor beam attachment
3: Vertical support rod
4: Horizontal support rod
5: First catch
6: Second catch
7: Third catch
8: First nose
9: Second nose
10: Third nose
11: Bearing surface
12: Engagement button
13: First adjustment button
14: Second adjustment button
15: Vertical opening
16: Support opening
17: First set of grooves
18: Second set of grooves
19: Guide rail clamp
20: First protrusion
21: Second protrusion
22: First body
23: First coil spring
24: Second body
25: Second coil spring
26: Third body
27: Third coil spring
28: Horizontal opening
29: Upper flange
30: Lower flange
31: Rear side
32: Lock screw
40: Conveyor
41: Conveyor beam
42: T-slot
43: Upper flange
44: Lower flange

The invention claimed is:

1. Conveyor beam attachment (2) adapted to be attached to a conveyor beam, the attachment (2) comprising:
   a first catch (5) having a first nose (8) pointing in a first direction, where the first catch (5) is adapted to engage one flange of a T-slot in the conveyor beam,
   a second catch (6) having a second nose (9), and
   a third catch (7) having a third nose (10),
   wherein:
      the second nose (9) and the third nose (10) point in a second direction opposite the first direction,
      the second catch (6) and the third catch (7) are adapted to engage the other flange of the T-slot in the conveyor beam,
      the second catch (6) and the third catch (7) are arranged on each side of the first catch (5), and
      the first catch (5) is spring-loaded and can be pushed to a release position with an engagement button (12) or that the second catch (6) and the third catch (7) are spring-loaded and can be pushed to a release position with an engagement button (12).

2. Conveyor beam attachment according to claim 1, wherein the conveyor beam attachment (2) comprises a vertical opening (15) adapted to receive a vertical support rod (3).

3. Conveyor beam attachment according to claim 2, wherein the vertical opening (15) comprises a first spring-loaded protrusion (20) adapted to engage with a groove (17) of the vertical support rod (3).

4. Conveyor beam attachment according to claim 3, wherein the first protrusion (20) can be pushed to a release position with a first adjustment button (13).

5. Conveyor beam attachment according to claim 2, wherein the vertical opening (15) is oval.

6. Conveyor beam attachment according to claim 1, wherein the conveyor beam attachment (2) comprises a horizontal opening (28) adapted to receive a first catch (5), a second catch (6) and a third catch (7) of another conveyor beam attachment (2).

7. Conveyor beam attachment according to claim 6, wherein the horizontal opening (28) is rectangular with an upper flange (29) and a lower flange (30), where the distance between the upper flange and the lower flange corresponds to the vertical distance between the first catch (5) and the second and third catches (6, 7) in a released state.

8. Conveyor beam attachment according to claim 1, wherein the conveyor beam attachment (2) comprises a lock screw (32) adapted to block the movement of the first catch (5) or the second and third catches (6, 7).

9. Conveyor beam attachment according to claim 8, wherein the lock screw (32) is adapted to block the movement of the engagement button (12), thereby blocking the movement of the first catch (5) or the second and third catches (6, 7).

10. Guide rail assembly (1) comprising a conveyor beam attachment (2) according to claim 1, wherein the guide rail assembly further comprises a vertical support rod (3) arranged in a vertical opening (15) comprised in the conveyor beam attachment (2) and a horizontal support rod (4) arranged in a support opening (16) comprised in the vertical support rod (3).

11. Guide rail assembly according to claim 10, wherein the vertical opening (15) comprises a first spring-loaded protrusion (20) adapted to engage with a groove (17) of the vertical support rod (3).

12. Guide rail assembly according to claim 10, wherein the support opening (16) comprises a second spring-loaded protrusion (21) adapted to engage with a groove (18) of the horizontal support rod (4).

13. Guide rail assembly according to claim 12, wherein the second protrusion (21) can be pushed to a release position with a second adjustment button (14).

14. Guide rail assembly according to claim 10, wherein the horizontal support rod (4) comprises a guide rail clamp (19).

15. Conveyor (40), comprising a plurality of guide rail assemblies (1) according to claim 10 and at least one conveyor beam (41).

* * * * *